(12) United States Patent
McKinney et al.

(10) Patent No.: US 9,446,377 B1
(45) Date of Patent: Sep. 20, 2016

(54) ROTARY CONTINUOUS REACTOR VESSEL AND METHOD FOR THE SAME

(71) Applicant: UNIMIN CORPORATION, New Canaan, CT (US)

(72) Inventors: Michael McKinney, Bakersville, NC (US); Shane McMahan, Spruce Pine, NC (US); Cameron McQueen, Erwin, TN (US)

(73) Assignee: Unimin Corporation, New Canaan, CT (US)

( * ) Notice: Subject to any disclaimer, the term of this patent is extended or adjusted under 35 U.S.C. 154(b) by 431 days.

(21) Appl. No.: 14/063,895

(22) Filed: Oct. 25, 2013

Related U.S. Application Data

(63) Continuation of application No. 13/348,873, filed on Jan. 12, 2012, now abandoned.

(60) Provisional application No. 61/432,819, filed on Jan. 14, 2011, provisional application No. 61/499,898, filed on Jun. 22, 2011.

(51) Int. Cl.
*B65B 31/00* (2006.01)
*B01J 19/28* (2006.01)
*B01J 8/00* (2006.01)

(52) U.S. Cl.
CPC ............... *B01J 19/28* (2013.01); *B01J 8/0045* (2013.01)

(58) Field of Classification Search
CPC .............................. B01J 8/0045; B01J 19/28
See application file for complete search history.

(56) References Cited

U.S. PATENT DOCUMENTS

| | | | | |
|---|---|---|---|---|
| 4,956,059 | A | * | 9/1990 | Englisch ............... B01J 19/087 205/766 |
| 5,637,284 | A | | 6/1997 | Sato et al. |
| 7,591,929 | B2 | | 9/2009 | Strand |
| 7,837,955 | B2 | | 11/2010 | Goldblatt et al. |
| 7,914,750 | B2 | | 3/2011 | Goldblatt et al. |
| 8,066,948 | B2 | | 11/2011 | Streng et al. |
| 2009/0208381 | A1 | | 8/2009 | Streng et al. |

* cited by examiner

*Primary Examiner* — Jason K Niesz
(74) *Attorney, Agent, or Firm* — Rankin, Hill & Clark LLP

(57) ABSTRACT

A continuous reactor vessel for a rotary reactor having a first disk and a second disk separating three zones wherein the first disk includes a material feed opening spaced from its peripheral edge by an inlet peripheral spacing and configured to receive a material inlet tube, the second disk including an axial extension spaced from the second peripheral edge having at least one axially extending side wall and an end cap with at least one reaction zone discharge opening in the extension. The at least one opening allowing for a continuous and controlled reactor discharge rate of the associated granular product from the reaction zone into the discharge zone, the discharge opening being spaced from the second peripheral edge by an outlet peripheral spacing such that the peripheral spacings define a controlled depth of a dead bed accumulation of the associated granular product in the reaction zone.

7 Claims, 4 Drawing Sheets

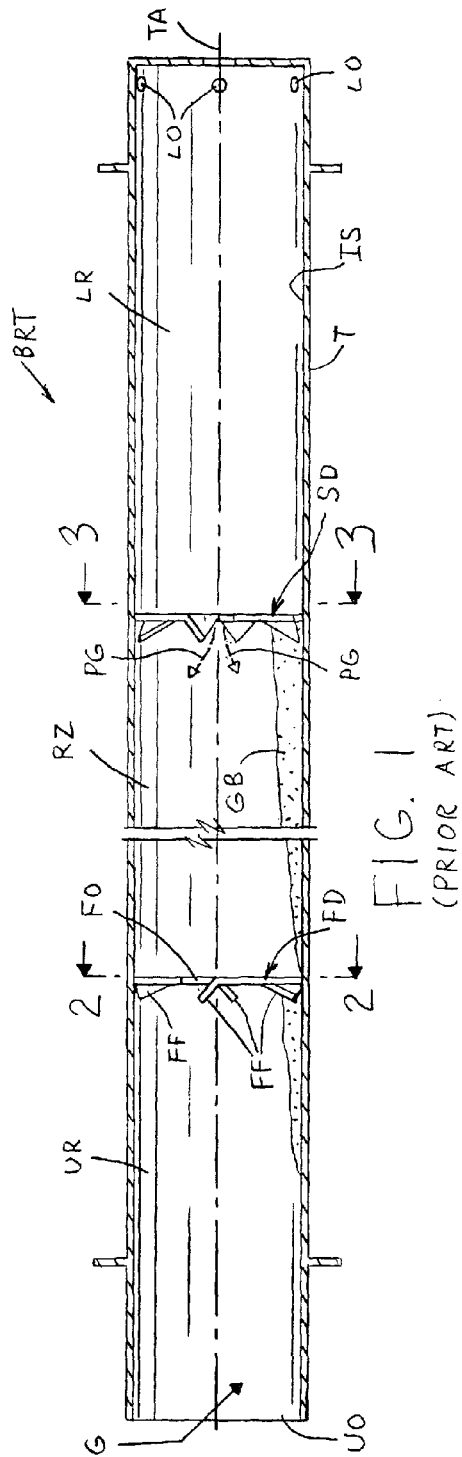
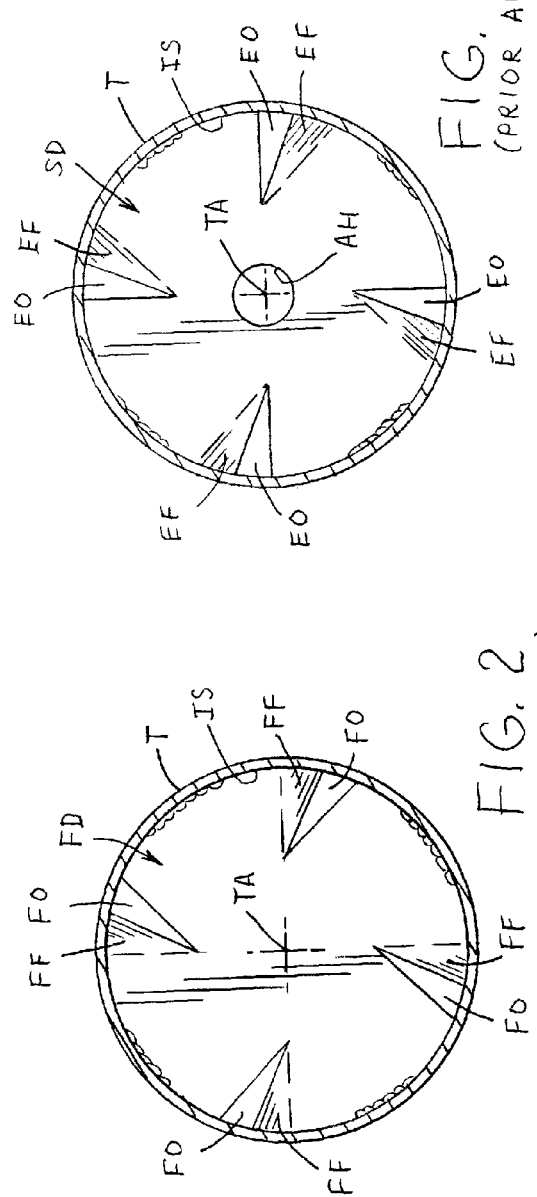
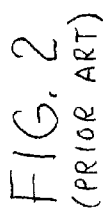
FIG. 1 (PRIOR ART)
FIG. 2 (PRIOR ART)
FIG. 3 (PRIOR ART)

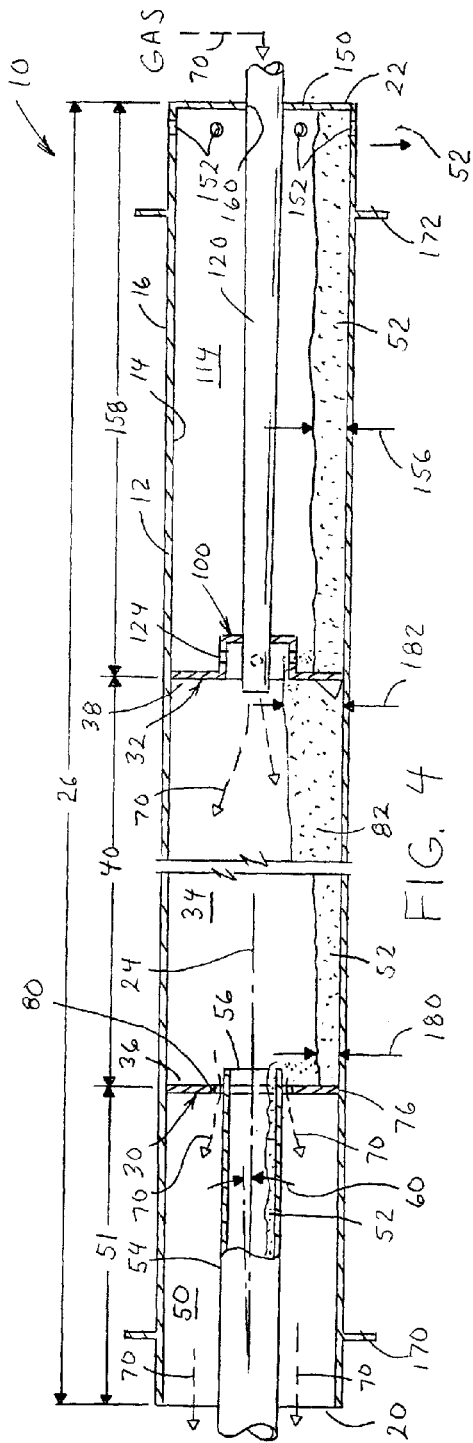
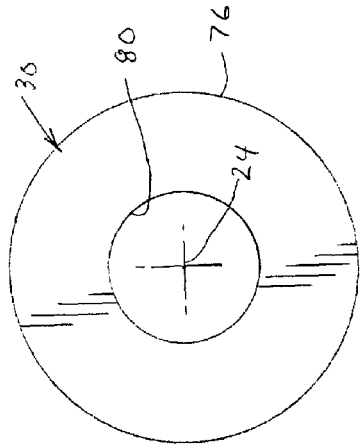
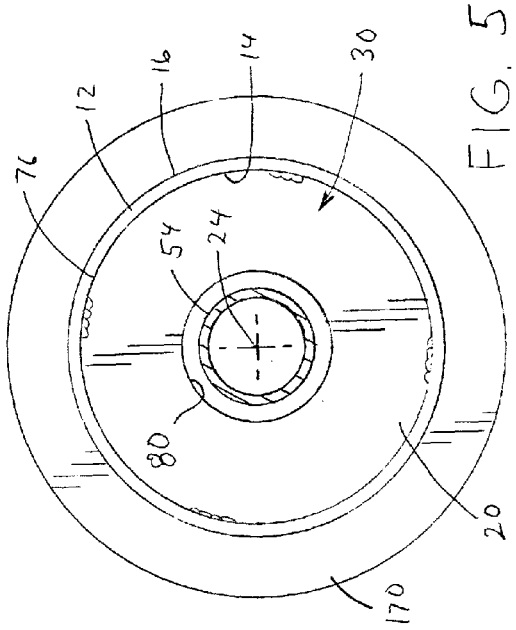

US 9,446,377 B1

ROTARY CONTINUOUS REACTOR VESSEL AND METHOD FOR THE SAME

PRIORITY CLAIM

This application is a continuation of U.S. Non-provisional patent application Ser. No. 13/348,873, Filed Jan. 12, 2012, which in turn claims priority in U.S. Provisional Patent Application Ser. No. 61/432,819 filed on Jan. 14, 2011 and claims priority in U.S. Provisional Patent Application Ser. No. 61/499,898 filed on Jun. 22, 2011, all of which are incorporated by reference into the specification of this application.

FIELD OF THE INVENTION

The present invention relates to rotary continuous reactor vessels, and particularly, to an improved interior configuration for the vessel. Specifically, the present invention relates to disk configuration for use in rotary tube reactors to allow control of movement of particulate material through the system.

INCORPORATION BY REFERENCE

Rotary batch reactor vessels are known in the art and are shown in U.S. Pat. No. 7,837,955 to Goldblatt et al and U.S. Pat. No. 7,914,750 to Goldblatt et al both of which are incorporated by reference into the specification of this application.

BACKGROUND OF THE INVENTION

Rotary tube furnaces and the reactor vessels are typically used to process granular powder at high temperature. The tube is rotated and serves two purposes. First, the rotation overcomes the grain's angle of repose and thereby produces gravity flow through the tube. And, second, rotation facilitates gas-to-grain contact by the overturning action it provides. When process gases are used in conjunction with rotary tube reactors, the tube is usually modified with apertures to control gas flow and grain movement.

As is shown in Goldblatt, batch reactor systems are known and have been found to successfully restrict ambient atmosphere from certain regions within a reactor tube. But, these systems work as a batch system wherein a granular product G is loaded into a reaction zone RZ and remains in this reaction zone until a desired reaction is completed. Then, the granular product is removed from the reaction zone. As a result, product is intermittent and production rates are dependent on the size of the reaction zone and the time to complete the reaction.

Shown in FIGS. 1-3 is a batch reactor system BRT having a reactor tube T and reaction zone RZ that is generally central within tube T. In operation a grain G is introduced into tube T by way of an upper opening UO and enters an upper region UR. System BRT is oriented at a downward angle and rotates about a tube axis TA a first rotational direction such that grain G moves toward a first disk FD and enters reaction zone RZ by way of a plurality of feed openings FO and feed flaps FF in first disk FD that are provided along the circumference of disk FD. Feed Flaps FF are oriented in such a way that they scoop or force the granular material G into the reaction zone when tube T is rotated in the first rotational direction.

Tube T further includes a second disk SD spaced from first disk FD which together define reaction zone RZ. However, while second disk SD also includes a plurality of openings along its circumference, these opening are exit openings and have exit flaps EF that are oriented such that rotation about tube axis TA in the first direction does not produce the "scooping" of the material G and, therefore, does not produce an exit flow out of the reaction zone. Thus, when rotation is in the first rotational direction, the reaction zone will be loaded with granular material G and will form a grain bed GB. Granular material continues to be loaded into the reaction zone until a desired grain bed is achieved and the tube then continues to rotate in the first rotational direction for a designated time for the desired reaction. Once the desired processing/reacting time is achieved, rotation is reversed such that exit flaps EF can "scoop" the granular material of grain bed GB out of the reaction zone into lower region LR. The grains then exit tube T by way of Lower Openings LO.

Feed openings FO, feed flaps FF, exit openings EO and exit flaps EF are fashioned from radial slits separated by ninety degrees from one another. The region of the disk adjacent to the slit is bent out of the plane of disks to create a triangularly shaped flap and the orientation of the flap depends on whether the flap is a feeding flap or an exiting flap to produce the desired "scooping" action depending on the direction of rotation. The arcs of the flaps are welded to an inside surface IS of a tube T of system BRT as are the circumferences of the disks.

Once a desired grain bed is created in reaction zone RZ, a process gas PG is introduced into reaction zone RZ by way of a small axial hole AH in second disk SD that is just large enough to accept a gas injector tube (not shown). The small amount of open area in the disk produces the desired restriction in gas flow along with a negative pressure condition at the upper end of the tube. The application of the process gas can continue for the duration of processing time for the batch process.

Although satisfactory in many respects, a need exists for an improved interior configuration for a tubular vessel, and for a component to be incorporated therein, that governs and more accurately controls flow of granular or particulate material through a rotary tube vessel and/or allows continuous processing.

SUMMARY OF THE INVENTION

The invention of this application relates to a continuous rotary reactor vessel and, more particularly, to an improved rotary reactor vessel with increased effectiveness of the reaction in the reaction zone.

More particularly, provided is a reactor vessel that allows for the continuous flow of particles for a rotary reactor that includes an inlet zone at the inlet end and a discharge zone at the outlet end with a reaction zone between the inlet and discharge zones. A first and a second disk separate the three zones wherein the first disk includes a central material feed opening spaced from its peripheral edge by an inlet peripheral spacing and the second disk includes an axial extension or "top hat" spaced from the second disk peripheral edge having at least one axially extending side wall and an end cap with at least one reaction zone discharge opening in the side wall. The at least one opening allowing for a controlled and continuous reactor discharge rate of the associated granular product from the reaction zone into the discharge zone, the at least one discharge opening being spaced from the second peripheral edge by an outlet peripheral spacing such that the inlet and outlet peripheral spacings define a controlled depth of a dead bed accumulation of the associated granular product in the reaction zone.

According to one set of aspects, the present invention provides a reactor vessel for a rotary reactor with an outer wall extending from an inlet end to an outlet end along a reactor axis and having an inner and an outer surface, the inlet end and outlet end generally defining a vessel length. The vessel further includes an inlet zone at the inlet end and a discharge zone at the outlet end with a reaction zone between the inlet and discharge zones and a first disk separating the inlet zone from the reaction zone, first disk being on inlet side of the reaction zone and defining a first extent of a reaction zone, the first disk having a first disk peripheral edge secured to the inner surface of the outer wall, the first disk further including a material feed opening spaced from the peripheral edge by an inlet peripheral spacing, the material feed opening allowing the inflow of an associated granular product from the inlet tube into the reaction zone. The vessel also includes a second disk separating the reaction zone from the discharge zone, the second disk being axial spaced from the first disk toward the outlet end and defining a second extent of a reaction zone on the outlet side of the reaction zone, the first and second disks defining a reaction zone length, the second disk having a second disk peripheral edge secured to the inner surface of the outer wall, the second disk further including an axial extension spaced from the second peripheral edge and extending axial toward the outlet end from a base edge adjacent the second disk to a distal end, the extension having at least one axially extending side wall and an end cap at the distal end and extending about the at least one wall, the end cap and at least one side wall separating the reaction zone from a discharge zone except for the at least one side wall including at least one reaction zone discharge opening to allow for a controlled reactor discharge rate of the associated granular product from the reaction zone into the discharge zone, the at least one discharge opening being spaced from the second peripheral edge by an outlet peripheral spacing. The vessel is configured such that the inlet peripheral spacing and the outlet peripheral spacing help define a controlled depth of a dead bed accumulation of the associated granular product in the reaction zone extending between the first and second extents.

According to yet another set of aspects of the invention, provided is a rotary reactor for processing a continuous flow of a granular product wherein the rotary reactor comprising a plurality of reactor vessels at least as described above.

According to even yet another set of aspects of the invention, provided is a method for selectively controlling flow of particulate material through a rotatable tubular vessel having an inlet end, an outlet end, and defining a hollow interior extending between the inlet and outlet ends, the method comprising the steps of:

providing a tubular vessel having an outer wall extending from an inlet end to an outlet end along a reactor axis and having an inner and an outer surface, the inlet end and outlet end generally defining a vessel length;

providing a first circular disk having a first disk peripheral edge;

configuring the first disk to include a material feed opening spaced from the peripheral edge by an inlet peripheral spacing to in part define a controlled depth of a dead bed accumulation of an associated granular product in a reaction zone;

providing a second disk having a upward side and a downward side, the second disk further including a second disk peripheral edge and an extension spaced from the second peripheral edge, the extension extending outwardly from the downward side from a base edge adjacent the second disk to a distal end, the extension having at least one side wall and an end cap at the distal end defining the overall configuration of the extension, the at least one side wall including at least one reaction zone discharge opening;

configuring the second disk such that the at least one reaction zone discharge opening is spaced from the second peripheral edge by an outlet peripheral spacing to in part define a controlled depth of a dead bed accumulation of an associated granular product in a reaction zone;

securing the first disk to the inner surface of the outer wall, such that the first disk separates the reaction zone from an inlet zone, the first disk thereby forming the inlet side of the reaction zone and defining a first extent of a reaction zone, the material feed opening allowing the inflow of an associated granular product from the inlet zone into the reaction zone; and, securing the second disk to the inner surface of the outer wall vessel such that the second disk separates the reaction zone from a discharge zone, the second disk being axial spaced from the first disk toward the outlet end and defining a second extent of a reaction zone on the outlet side of the reaction zone and a reaction zone length, the upward side facing the reaction zone and the downward side facing the discharge zone, the at least one reaction zone discharge opening allowing the outflow of an associated granular product from the reaction zone into the discharge zone.

Further advantages and configurations of a reactor vessel and/or a rotary reactor according to the invention will become apparent from the following description of preferred exemplary embodiments of reactor vessel and/or a rotary reactor according to the invention, shown in the drawings. Further, these and other objects, aspects, features, developments and advantages of the invention of this application will become apparent to those skilled in the art upon a reading of the Detailed Description of Embodiments set forth below taken together with the drawings which will be described in the next section.

BRIEF DESCRIPTION OF THE DRAWINGS

The present invention may take form in various components and arrangements of components, and in various techniques, methods, or procedures and arrangements of steps. The referenced drawings are only for purposes of illustrating preferred embodiments, they are not necessarily to scale, and are not to be construed as limiting the present invention.

FIG. 1 is a sectional view of a prior art batch reactor tube;

FIG. 2 is a sectional view taken along lines 2-2 in FIG. 1 showing a first disk;

FIG. 3 is a sectional view taken along lines 3-3 in FIG. 1 showing a second disk;

FIG. 4 is a sectional view of a continuous reactor vessel according to certain aspects of the invention of this application;

FIG. 5 is an end view of the high end or inlet end of the reactor vessel shown in FIG. 4;

FIG. 6 is a detached end view of a first disk as is shown in FIG. 4;

DETAILED DESCRIPTION OF EMBODIMENTS

Figure 7:
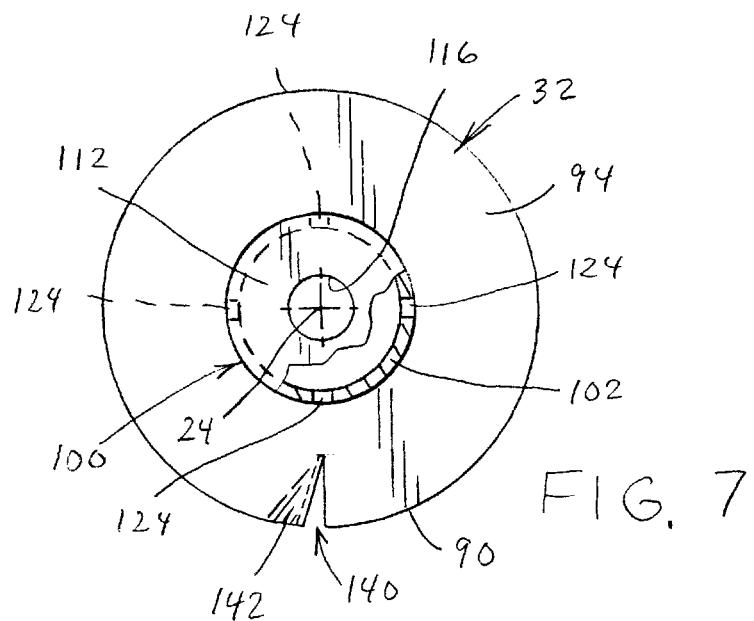
FIG. 7 is a detached end view of a second disk as is shown in FIG. 4.
Figure 8:
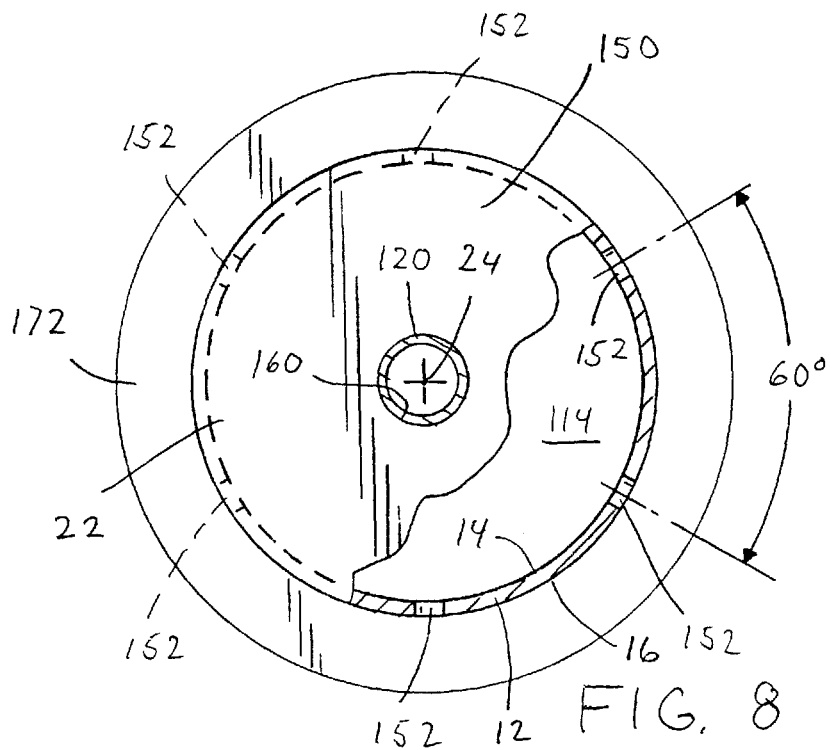
FIG. 8 is an end view of the low end or outlet end of the vessel shown in FIG. 4; and, FIG. 9 is an enlarged sectional view of the second disk shown in FIGS. 4 and 7.
Figure 9:
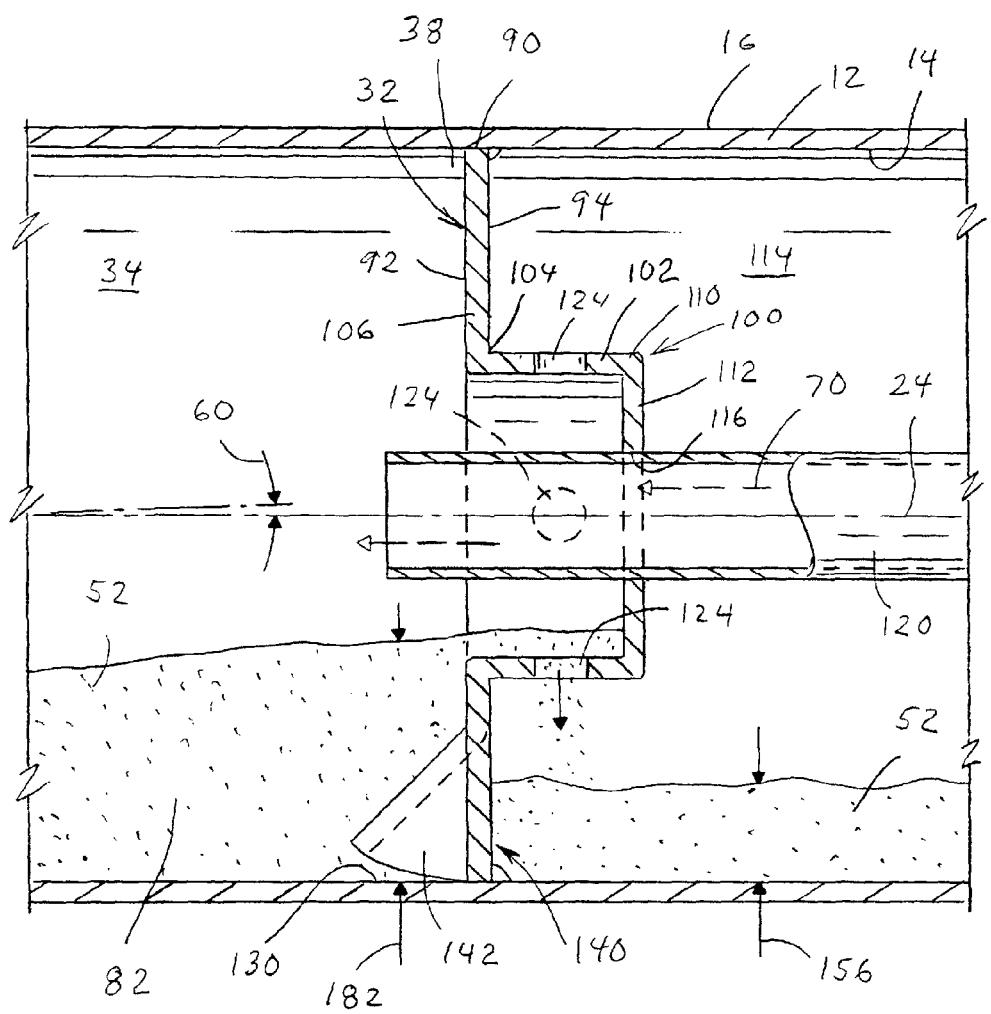

Referring now to the drawings wherein the showings are for the purpose of illustrating preferred and alternative embodiments of the invention only and not for the purpose of limiting same, FIGS. 4-9 show a reactor vessel 10 which is a rotary reactor vessel used to process an associated granular product continuously at a high temperature and often in combination with a reaction gas that will be discussed in greater detail below.

More particularly, reactor vessel 10 includes an outer wall 12 having an inner surface 14 and an outer surface 16. Outer wall 12 can be a tubular wall extending from an inlet end 20 to an outlet end 22 and extending about a vessel axis 24. Inlet end and outlet end generally defining a vessel length 26. Vessel length can be any length and in one embodiment is it greater than 100 inches. In another embodiment, it is greater than 150 inches. In yet another embodiment, it is approximately 175 inches. Outer wall 12 can be made from any material known in the art including, but not limited to, steels and alloys thereof including stainless steel; glass and composite materials.

Reactor vessel 10 further includes a first disk 30 and a second disk 32 configured to define a reaction zone 34 extending therebetween. Essentially, first disk 30 can define a first extent 36 of the reaction zone and second disk 32 can define a second extent 38 of the reaction zone. As will be discussed below, the reaction zone has a zone length 40 that can be a wide range of lengths. In one embodiment, reaction zone length 40 is greater than 90 inches. In another embodiment, the reaction zone length is between 100 and 200 inches. In a further embodiment, the reaction zone length is approximately 140 inches.

First disk 30 further defines an inlet zone 50 which is generally spaced between inlet end 20 and disk 30. Inlet zone 50 has an inlet length 51 which is generally defined between inlet end 20 and the first disk 30. Inlet length 50 can be any length and in one embodiment is it 8 inches. In another embodiment, it is greater than 10 inches. In yet another embodiment, it is approximately 13 inches.

Inlet zone 50 receives a material flow of an associated granular product 52 by way of an inlet tube 54 wherein inlet tube 54 directs product towards and into reaction zone 34 and tube 54 has an end opening 56 in reaction zone 34 such that product 52 is deposited in the reaction zone. In view of inlet tube 54, product 52 remains spaced from inner surface 14 of outer wall in zone 50. Inlet tube is a stationary tube and does not rotate with reactor vessel 10. The rotation of vessel 10 and/or a vessel slope angle 60 of reactor vessel 10 can produce the material flow of product 52 in vessel 10 once product 52 exits the inlet tube. In this respect, the reactor vessel is downwardly sloped at the vessel slope angle such that inlet end 20 is higher than outlet end 22. This vessel slope angle creates, at least in part, a gravity feed for associated granular product 52 from the inlet end toward the outlet end. This, in combination with the rotation of reactor vessel 10 about vessel axis 24, can facilitate the movement of powder 52 from inlet end 20 to outlet end 22 via reaction zone 34 which will be discussed in greater detail below. In this respect, the rotation of rotary vessel 10 about vessel axis 24 can further facilitate the reaction within the reaction zone by increasing the gas-to-grain contact between powder 52 and a reaction gas 70 which will be part of the discussion below.

Disk 30 can be a circular disk having a peripheral edge 76 wherein peripheral edge 76 is joined to inner surface 14 of the outer wall. This joining of disk 30 with the outer wall can be by any method known in the art including, but not limited to, full contact welding of the disk to the outer wall or intermitted weld points. Disk 30 further includes an opening 80 that is spaced from peripheral edge 76 which can, at least in part be used to control a dead bed 82 and the height of the dead bead in reaction zone 34 which will be discussed in greater detail below. Disk 30 at least controls an upward extent of the reaction zone which also will be discussed in greater detail below. In one embodiment, the material feed opening is spaced from peripheral edge 76 by at least two inches. In another embodiment, the material feed opening is spaced from the peripheral edge at least three inches and in a further embodiment, it is approximately 3.5 inches from the peripheral edge. Further, the material feed opening can be circular in configuration and can have a diameter of approximately 3.5 inches. Inlet tube 54 extends through material feed opening 80 wherein opening 56 is in zone 34 thereby allowing the product exiting the tube to be deposited in the reaction zone for processing. In that tube 54 is stationary, opening 80 is larger than tube 54. In one embodiment, tube 54 is about 58 mm in diameter and opening 80 is about 100 mm in diameter.

Disk 32 included a peripheral edge 90 that is joined to inner surface 14 of the outer wall. Disk 32 has an upward flow side 92 facing zone 34 and an oppositely facing downward side 94 with a top hat extension 100 extending from downward side 94. Extension 100 is axially extending from disk 32 toward outlet end 22. In greater detail, extension 100 includes an axially extending side wall 102 having a base edge 104 joined to disk portion 106 and side wall 102 extends axially towards outlet end 22 to a distal end 110. Extension 100 further includes an end cap 112 generally closing the extension from a discharge zone 114. However, end cap 112 further includes a reaction gas opening 116 shaped to receive a reaction gas tube 120 for directing reaction gas 70 into reaction zone 34 which will be discussed more below.

Extension 100 further includes discharge openings 124 in side wall 102 which are configured to control the flow of granular product 52 from reaction zone 34 to discharge zone 114 which will be discussed in greater detail below. In one embodiment, the discharge openings are approximately 0.5 inches in diameter. Disk portion 106 can be configured so that discharge openings 124 are spaced from a downward edge 130 of outer wall 12 thereby, at least in part, controlling the depth or height of dead bed 82 which will be discussed more below.

In that discharge openings 124 are spaced from downward edge 130, the granular powder in dead bed 82 can get trapped in reaction zone 34 when a production cycle is completed. Thus, disk portion 106 can include a clean-out opening 140 that can be a radial slit extending radially inwardly from peripheral edge 90 which is bent inwardly into reaction zone 34 thereby creating a clean-out flap 142. Flap 142 can be utilized to substantially remove remaining powder 52 from the reaction zone when the production cycle is completed. However, as will be discussed more below, during the production cycle, only a minimal amount of process powder will be allowed to flow through the clean-out opening in that it will be generally blocked by way of the material being fed into the discharge zone from discharge openings 140 and/or the orientation of flap 142 in relation to the rotation of vessel 10. However, once the flow ceases from the discharge openings, the clean-out flap 142 will be able to force the remaining processed powder from the reaction zone into the discharge zone.

In yet another set of embodiments, the flap of clean out opening 142 can be reversed such that the flap resists material flow when the system is in operation and the rotation of the tube about axis 24 is reversed to "clean out" the dead bed at the end of the production cycle.

As will be discussed in greater detail below, the material exiting reaction zone 34 enters discharge zone 114 primarily via discharge openings 124. Based on the rotation of reactor vessel 10 about vessel axis 24 and vessel slope angle 60, granular powder 52 travels or moves from disk 32 towards outlet end 22. Discharge zone 114 has an end plate 150 and discharge openings 152 extending about outer wall 12. Discharge openings 152 control the outflow of powder 52 from the discharge zone and can be configured to produce an exiting flow rate similar to that of openings 124 such that the flow into discharge zone 114 and out of discharge zone 114 can be generally uniform thereby producing a generally uniform discharge flow depth 156 along a length 158 of the discharge zone. In one embodiment, the discharge zone openings 152 and the reactor zone discharge openings 124 can be the same in number and size. In another embodiment, each section includes four circumferentially spaced openings that are 90° apart about vessel axis 24. However, as can be appreciated, more or less openings and/or different sized openings could be utilized in accordance with the invention of this application to obtain a desired flow rate.

In yet other embodiments, the number of discharge openings 152 in discharge zone 114 can be different than the number of discharge openings 124 in reaction zone 34. This can be utilized to account for the difference in diameter between wall 102 and wall 12. Or, larger holes could be used for discharge openings 152. In one embodiment, and as is shown in the drawings, four discharge openings 124 can be utilized in wall 102 and these openings can be spaced 90 degrees from one another about axis 24. Discharge zone 114 can include a six discharge opening arrangement wherein wall 12 includes six openings 152 near end cap 150 and these openings can be spaced from one anther by sixty degrees.

Gas injector tube 120 extends through an opening 160 in end plate 150 of outlet end 22 and through discharge zone 114 and reaction gas opening 116 of disk 32. As with inlet tube 54, injector tube 120 can be a stationary tube wherein vessel 10 rotates about the stationary tubes. In the embodiments wherein inlet tube 54 and injector tubes are stationary, there is a gap between the respective tubes and disk such that reaction gas 70 can pass therebetween. This is controlled by having a negative pressure at inlet end such that gas is urged toward the inlet end and through opening 80, but which is generally prevented from flowing through opening 116. Thus, by utilizing injector tube 120 to deliver reaction gas 70 allows the reaction gas to enter the reaction zone without a substantial amount of the gas entering into the discharge zone. As will be discussed more below, the discharge zone is intended to reduce the reaction of granular powder 52 before it exits reactor vessel 10 by way of openings 152.

As is discussed above, the reactor vessel of this application can rotate about vessel axis 24. This can be facilitated by the use of an annular inlet flange 170 and an annular outlet flange 172 both extending about outer wall 12. These can be used in connection with rotational feet (not shown) utilized to maintain the rotation of the reactor vessel about the vessel axis. These feet can form an assembly including four metal rectangular pads (not shown) that can be three inches by four inches square and which are formed such that they have a radius similar to that of outer wall 12. These four feet can be equally positioned about the vessel axis and guide the reactor vessel as it rotates about vessel axis 24. In order to reduce friction and/or contact between dissimilar materials, these feet can include a high temperature cloth spacer separating the foot from outer wall 12. Further, the feet assembly can include springs (not shown) utilized to urge the feet against the outer wall. Further, by including inlet zone 50, the feet assembly supporting the inlet portion of the vessel at flange 170 can be spaced from the heat zone that is generally centered around the reaction zone of the vessel. This can help improve the longevity of the system.

As referenced above, the invention of this application relates to a reactor vessel 10 having multiple zones to facilitate the processing of granular material or powder 52 with both heat and reaction gas 70. In the embodiment shown, the reactor vessel has three zones, namely, inlet zone 50, reaction zone 34 and discharge zone 114. In operation, the granular powder to be processed is directed through inlet zone 50 and into the reaction zone by way of tube 54. Inlet zone 50 is separated from reaction zone 34 by disk 30 which includes material opening 80 that is spaced from peripheral edge 76. The feed rate of granular powder 52 along with the slope angle 60 can be used in combination with the feed openings to produce a controlled inlet depth 180 and a controlled outlet depth 182 of dead bed 82. More particularly, the feed rate of granular powder 52 can be controlled so that inlet depth 180 near disk 30 is approximately one inch in one embodiment. This controlled inlet depth is below material feed opening 80 in first extent 36 of the reaction zone. In view of vessel slope angle 60, dead bed 82 can increase in depth as it extends toward disk 32. Thus, controlled outlet depth 182 can be greater than controlled inlet depth 180. Further, the increase in the controlled outlet depth can be controlled in part based on slope angle 60 and the spacing between discharge openings 124 and downward edge 130. Further, reaction zone length 40 can impact the dead bed depth and the rate of increase of the dead bed depth as the dead bed approaches disk 32. In one set of embodiments, the controlled inlet depth 180 is approximately 1.0 inches and the controlled outlet depth 182 is approximately 2.5 inches.

While it has been found that slope angle 60 can vary, it is preferred that angle 60 is between 0.5 degrees and 3.0 degrees and more preferably between 1.0 degrees and 1.5 degrees wherein the preferred slope for the reaction tube is between 1.2 degrees and 1.3 degrees.

Once the granular powder reaches the reaction zone, this powder is heated to a desired temperature and it is engaged by reaction gas 70 provided from injector tube 120. The rotation of reactor vessel 10 about vessel axis 24 facilitates both the heating of the sand or granular product in the dead bed and the gas-to-grain contact of reaction gas 70 with particles 52.

Then once granular powder 52 moves towards disk 32, the granular powder is discharged into discharge zone 114 via discharge openings 124. In that the flow rate through discharge zone 114 is controlled, granular powder 52 has a generally uniform flow depth 156 from disk 32 to discharge openings 152. While in the discharge zone, granular powder 52 is separated from the reaction gas to substantially stop the reaction before granular powder 52 is discharged from reactor vessel 10. The use of injector tube 120 helps facilitate the separation of reaction gas 70 from discharge zone 114.

In one embodiment, discharge flow depth is approximately 0.5 inches deep in discharge zone 114. In that the discharge flow depth is 0.5 inches, clean-out flap 142 is not capable of forcing a significant amount of powder 52 into the discharge zone thereby the vast majority of flow is by way of discharge openings 124. Further, the spacing of discharge openings 124 from downward edge 130 helps maintain the desired dead bed depth for reaction zone 34. Yet even further, the depth reduces the amount of reaction gas allowed to enter into discharge zone 114.

It has been found that the capacity of this continuous system is an improvement over the prior art batch systems at least in part based on the increased depth of sand or material 52 in the reaction zone, namely, based on the dead bed depth. Further, the system is continuous wherein up to 70%, higher throughput can be realized by making adjustments to the discharge openings in both the "top hat" and the discharge zone. This can be by larger openings and/or more openings.

Further, reactor 10 can be used in a system of reactor vessels wherein several reactor vessels 10 are utilized. In one embodiment, more than ten reactor vessels can be used. In other embodiments, at least twenty reactor vessels 10 can be utilized. In other embodiments, between 20 and 55 reactor vessels 10 can be used and in one exemplary embodiment, approximately 45 reactor vessels 10 can be utilized.

While outer wall 12 is shown to be a single tubular component, the outer wall could be formed by multiple sections without detracting from the invention of this application. This can include multiple sections generally following the three zones (50, 34 & 114) of reactor vessel 10. However, other section configuration could also be utilized.

Further, provided is a method for selectively controlling flow of particulate material 52 through rotatable tubular vessel 12 having inlet end 20, outlet end 22, and defining a hollow interior extending between the inlet and outlet ends. This method comprising the steps of:

providing a tubular vessel having outer wall 12 extending from inlet end 20 to outlet end 22 along reactor axis 24 and having inner surface 14 and outer surface 16;

providing disk 30 having peripheral edge 76;

configuring the first disk to include material feed opening 80 spaced from the peripheral edge by an inlet peripheral spacing to in part define a controlled depth of dead bed accumulation 82 of granular product 52 in reaction zone 34 and define an extent of the dead bed;

providing second disk 32 having a upward side and a downward side, the second disk further including peripheral edge 90 and extension 100 spaced from the peripheral edge. The extension having side wall 102 and end cap 112 at distal end 110 defining the overall configuration of the extension. Further, providing at least one reaction zone discharge opening 124 in the side wall;

configuring disk 32 such that discharge openings 124 are spaced from peripheral edge 90 by an outlet peripheral spacing to in part define the controlled depth of dead bed accumulation 82 of granular product 52 in reaction zone 34;

securing disk 30 to inner surface 14 of outer wall 12 such that disk 30 separates reaction zone 34 from inlet zone 50, disk 30 thereby forming first extent 36 of reaction zone 34.

providing inlet tube 54 and positioning the inlet tube through the material feed opening 80 wherein the inlet tube provides a flow of granular product into reaction zone 34; and, securing second disk 32 to inner surface 14 of outer wall 12 such that disk 32 separates reaction zone 34 from discharge zone 114 wherein disk 32 is axial spaced from disk 30 toward outlet end 22 and defines second extent 38 of reaction zone 34 on the outlet side of the reaction zone and reaction zone length 40. The upward side of disk 32 facing reaction zone 34 and the downward side facing discharge zone 114 and discharge openings 124 allowing the outflow of granular product 52 from reaction zone 34 into discharge zone 114.

providing gas tube 120 and positioning the gas tube through the second disk so that reaction gas 70 is directed into reaction zone 34.

The present invention assembly and its components may be formed from nearly any material that is sufficiently rigid and resistant to the conditions in which the assembly will be used. Examples of such materials include, but are not limited to, steels and alloys thereof including stainless steel; glass and composite materials.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A rotary reactor vessel for a reactor, the rotary vessel comprising:

an outer wall extending between an inlet end to an outlet end along a reactor axis and having an inner surface and an outer surface, the inlet end and outlet end generally defining a vessel length;

an inlet zone near the inlet end and a discharge zone near the outlet end with a reaction zone between the inlet zone and discharge zone;

a first disk separating the inlet zone from the reaction zone, the first disk being on an inlet side of the reaction zone and defining a first extent of the reaction zone, the first disk having a first disk peripheral edge secured relative to the inner surface of the outer wall, the first disk being an annular inlet disk with a material feed opening defined by an inner extent of the annular disk and the outer extent of the annular disk forming the first disk peripheral edge such the entire material opening is spaced from the peripheral edge by at least an inlet peripheral spacing, the material feed opening having a material opening size configured to allow an inlet tube to extend therethrough such that the inlet tube extends inwardly from the inlet zone into the reaction zone and provides an associated inflow of an associated granular product directly into the reaction zone, the material opening size being greater than the inlet tube to allow an associated reaction gas to exit the reaction zone and the associated reaction gas to be isolated from the associate granular product in the inlet zone;

a second disk separating the reaction zone from the discharge zone, the second disk being axially spaced from the first disk toward the outlet end and defining a second extent of the reaction zone on the outlet side of the reaction zone, the first and second disks defining a reaction zone length, the second disk including a central axial extension having an extension peripheral extent and an annular outlet disk extending radially outwardly from the extension peripheral extent and the annular outlet disk having a second disk peripheral edge secured relative to the inner surface of the outer wall, the central axial extension being generally coaxial with reactor axis and the annular outlet disk spacing the central axial extension from the second peripheral edge, the central axial extension extending axially into the discharge zone from a base edge adjacent the second disk to a distal end, the extension having at least one axially extending side wall and an end cap at the distal end the central axial extension including at least one reaction zone discharge opening configured to allow for a continuous controlled reactor discharge rate of the associated granular product from the reaction zone into the discharge zone, the at least one discharge opening being spaced from the annular outlet disk of the second disk thereby forming an exit flow of the associated granular product from the reaction zone into the discharge zone that passes into the discharge zone at a location spaced from the outer wall.

2. The reactor vessel of claim 1 wherein the rotary reactor vessel is continuously rotated in a single direction about the reactor axis for both inflow and outflow of the associated material.

3. The reactor vessel of claim 1 wherein the annular outlet disk of second disk further includes a cleanout opening near the second disk peripheral edge, the cleanout opening being configured to empty the reaction zone after production is concluded.

4. The reactor vessel of claim 3 wherein the cleanout opening is a radial slit adjacent the second disk peripheral edge that is bent out of the plane of the second disk to create a triangularly shaped flap.

5. The reactor vessel of claim 1 wherein the central axial extension is a cylindrical extension and the at least one side wall is a cylindrical side wall coaxial with the vessel axis.

6. The reactor vessel of claim 1 wherein the inlet zone extends from the inlet end to the reaction zone and a discharge zone extends from the outlet end to the reaction zone.

7. A rotary reactor vessel for a reactor, the rotary vessel comprising:
  an outer wall extending between an inlet end to an outlet end along a reactor axis and having an inner surface and an outer surface, the inlet end and outlet end generally defining a vessel length, the outer wall rotating in a single direction about the reactor axis during all phases of production of an associated granular product thereby producing a continuous flow of the associated granular product;
  an inlet zone near the inlet end and a discharge zone near the outlet end with a reaction zone between the inlet zone and discharge zone;
  a first annular disk separating the inlet zone from the reaction zone, the first annular disk being on an inlet side of the reaction zone and defining a first extent of the reaction zone, the first annular disk having an inner and an outer peripheral edge, the outer peripheral edge being secured relative to the inner surface of the outer wall, the inner peripheral edge defining a material feed opening and the inner the full extent of the material feed opening being spaced from the inner surface of the outer wall such that an incoming flow of the associated granular product falls into the reaction zone, the radial outward extent of the material feed opening being spaced from the inner surface by an inlet peripheral spacing;
  an inlet tube configured to control the incoming flow of the associated granular product, the inlet tube being sized to extend through the material opening size and provide a reaction gas exit port to allow an associated reaction gas to exit the reaction zone, the inlet tube at least partially isolating the incoming flow of the associated granular product from the associated reaction gas in the inlet zone to better control the reaction;
  a second disk separating the reaction zone from the discharge zone, the second disk being axially spaced from the first disk toward the outlet end and defining a second extent of the reaction zone on the outlet side of the reaction zone, the first and second disks defining a reaction zone length, the second disk having a central axial extension with an extension peripheral extent and an annular outlet disk extending radially outwardly from the extension peripheral extent and extending circumferentially about the extension peripheral extent and the reactor axis, the annular outlet disk having a second disk peripheral edge secured relative to the inner surface of the outer wall, the central axial extension being generally coaxial with reactor axis and the annular outlet disk spacing the central axial extension from the second peripheral edge, the central axial extension extending axially into the discharge zone from a base edge adjacent the second disk to a distal end, the extension having at least one axially extending side wall and an end cap at the distal end the central axial extension including at least one reaction zone discharge opening configured for a continuous controlled reactor discharge rate of the associated granular product exiting from the reaction zone into the discharge zone, the at least one discharge opening being spaced from the annular outlet disk of the second disk thereby forming an exit flow of the associated granular product from the reaction zone into the discharge zone that passes into the discharge zone at a location spaced from the outer wall.

* * * * *